March 14, 1939. C. W. BONDURANT 2,150,203
THERMOSTATIC ELECTRIC SWITCH DEVICE
Filed Oct. 4, 1932 3 Sheets-Sheet 1
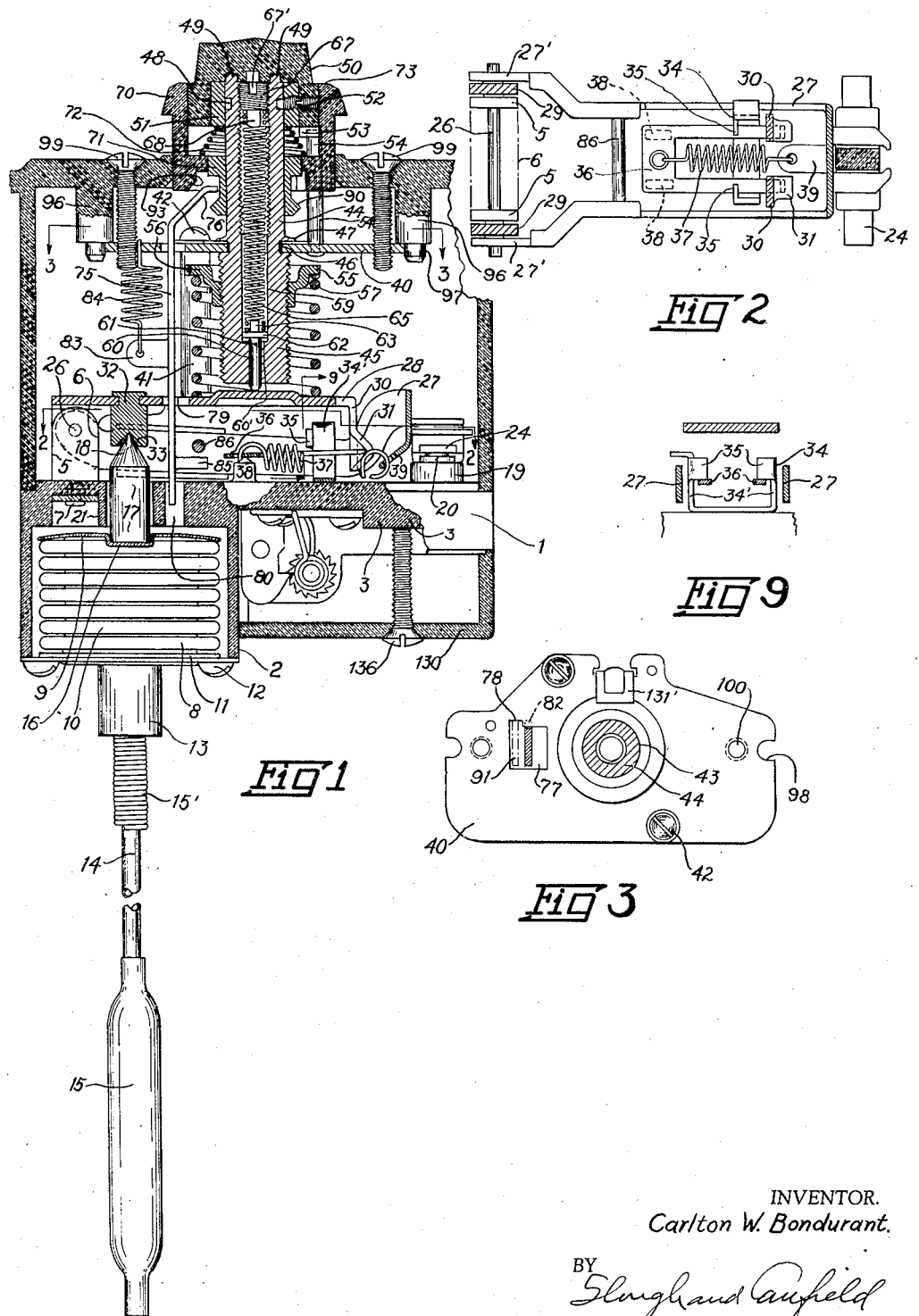
INVENTOR.
Carlton W. Bondurant.
BY
ATTORNEY.

March 14, 1939. C. W. BONDURANT 2,150,203
THERMOSTATIC ELECTRIC SWITCH DEVICE
Filed Oct. 4, 1932 3 Sheets-Sheet 2
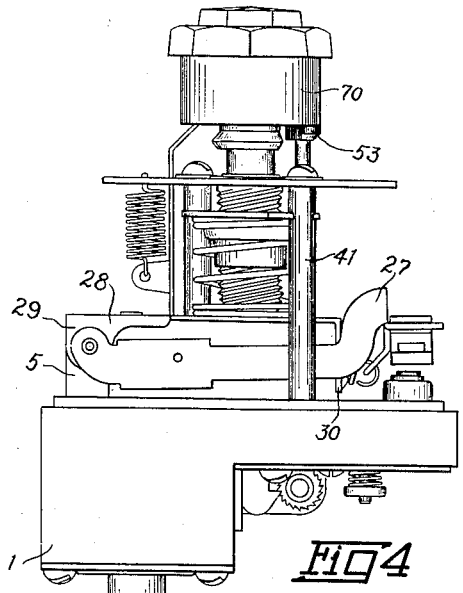
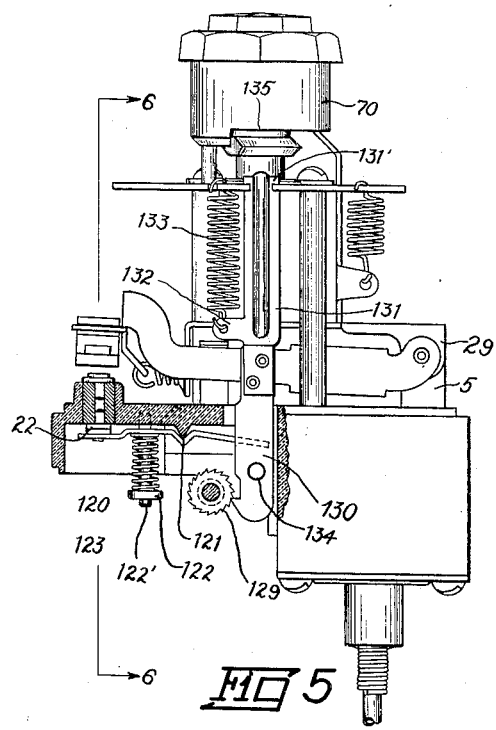
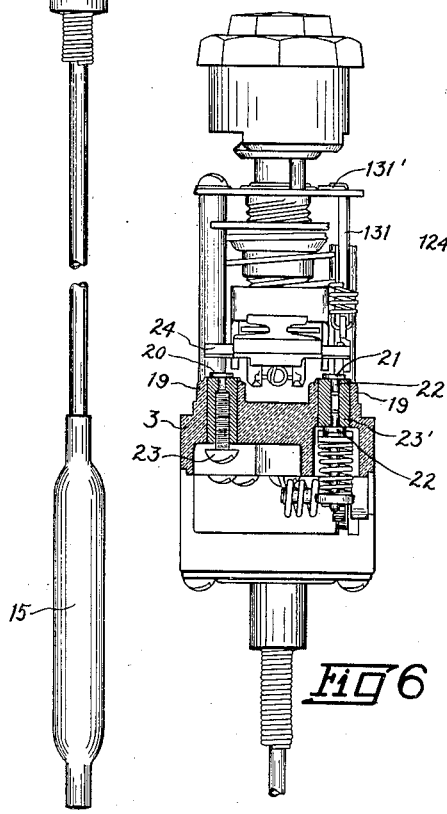
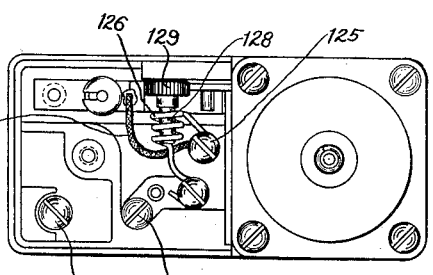
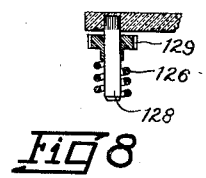
INVENTOR.
Carlton W. Bondurant.
BY Slough and Canfield
ATTORNEY.

March 14, 1939.  C. W. BONDURANT  2,150,203
THERMOSTATIC ELECTRIC SWITCH DEVICE
Filed Oct. 4, 1932   3 Sheets-Sheet 3

INVENTOR.
Carlton W. Bondurant.
BY
ATTORNEY.

Patented Mar. 14, 1939

2,150,203

UNITED STATES PATENT OFFICE 2,150,203

THERMOSTATIC ELECTRIC SWITCH DEVICE

Carlton W. Bondurant, Cleveland, Ohio, assignor to The Bishop & Babcock Mfg. Company, Cleveland, Ohio, a corporation of Ohio Application October 4, 1932, Serial No. 636,159

2 Claims. (Cl. 200—81)

This invention relates to means and methods for controlling the temperature produced by power operated refrigerator apparatus, particularly apparatus of the electric power operated class.

Heretofore in the control of electrical apparatus, such for example as domestic refrigerators, control devices have been employed responsive to changes of temperature of a refrigerator compressor, or of a portion of the refrigerator apparatus, to control the stopping and starting of an electric power supplying motor, to maintain the refrigerator or compressor at substantially a constant temperature, predeterminedly adjustable by suitable adjustment means on the controlled device.

The power is automatically turned on and off periodically by the device as the temperature reaches respectively predetermined high and low values. The average value is commonly referred to as the temperature "range" and the temperature difference between the high and low values is commonly referred to as the temperature "differential".

In refrigerating apparatus employing refrigerant circulated through pipes or conduits to absorb heat from the refrigerator compressor, frost usually forms upon the exposed pipes after a period of operation.

Heretofore it has been customary in order to remove the frost, to manually effect a so-called "defrosting" operation by shutting down the power and permitting the refrigerator to warm up to a temperature at which the frost will melt off. Such defrosting operation requires attention and skill to avoid too long continuance thereof and the consequent attainment of a high temperature at which food or the like in the refrigerating compartment will spoil.

It is an object of this invention to provide an improved method and means for controlling refrigerating apparatus whereby defrosting may be effected in an improved manner.

Another object is to provide an improved method and means for controlling refrigerating apparatus whereby defrosting may be effected in an improved manner without danger of attainment of an undesirably high temperature.

Another object is to provide such a method and means whereby, to effect the defrosting operation, the temperature of the refrigerator may be maintained at substantially a predetermined maximum sufficient to effect defrosting but low enough to preserve food or the like in the refrigerator compartment.

Another object is to provide, in an automatic power operated refrigerator of the class in which the power is periodically turned off and on in response to changes of temperature of a control point or station thereof to maintain a predetermined temperature differential and temperature range, improved means to effect a change of temperature range independently of the temperature differential.

Another object is to provide, in an automatic power operated refrigerator of the class referred to, improved means whereby the temperature range may be raised to effect a defrosting operation while concurrently maintaining the refrigerator at a food preserving temperature and at a predetermined temperature differential.

Another object is to provide in an automatic power operated refrigerator of the class in which the power is periodically turned off and on in response to changes of temperature of a control point or station thereof, to maintain a predetermined temperature differential and temperature range, improved means to effect a change of temperature range independently of the temperature differential.

Another object is to provide in an improved thermostatic electric switch device for automatically controlling the electric motor of a motor operated refrigerator apparatus.

Another object is to provide such a thermostatic electric switch having improved means for rendering the device responsive to temperature of a selected point or station of the refrigerating apparatus, to maintain a compartment or the like of a refrigerator at substantially a constant range temperature.

Another object is to provide such a thermostatic electric switch device having improved adjustment means for varying the predetermined range temperature.

Another object is to provide a thermostatic electric switch device of the class referred to having improved means for varying adjustably the temperature differential.

Another object is to provide an improved thermostatic electric switch device of the class referred to having improved operable means for stopping the motor for an extended period of time and for starting it up again at the end of that time.

Another object is to provide in an electric control device for refrigerator motors, improved means for stopping the motor automatically in case of a current overload to the motor.

Another object is to provide an electric control device for refrigerator motors, an improved thermally actuable means for stopping the motor in case of a current overload thereto and improved manually operable means for restarting the motor.

Another object is to provide a method and apparatus for effecting defrosting or frost prevention in a refrigerating apparatus comprising a compressor while concurrently operating the compressor.

Another object is to provide a method and apparatus for producing a defrosting or frost preventing temperature in a refrigerating apparatus while concurrently operating the compressor and whereby the said temperature may be adjusted in an improved manner.

Another object is to provide an improved thermostatic electric switch of the class referred to adapted to economical manufacture and efficient operation.

Another object is to provide such a thermostatic electric switch which is adapted to present an aesthetic appearance when installed in connection with a commercial, domestic or the like refrigerator.

Other objects will be apparent to those skilled in the art to which my invention appertains.

My invention is fully described in the following description taken in connection with the accompanying drawings, in which:

Fig. 1 is a vertical medial sectional view of a thermostatic electric switch device embodying my invention;

Fig. 2 is a plan sectional view taken from the plane 2—2 of Fig. 1;

Fig. 3 is a plan sectional view taken from the plane 3—3 of Fig. 1 with a portion of the casing omitted;

Fig. 4 is an elevational view generally similar to Fig. 1 but wherein the casing enclosing the switch mechanism has been removed;

Fig. 5 is an elevational view partially in section and taken at a side opposite from that illustrated in Fig. 4;

Fig. 6 is a side elevational partly sectional view taken from the plane 6—6 of Fig. 5;

Fig. 7 is a bottom view with a casing removed;

Fig. 8 is a fragmentary sectional view of a part of Fig. 7;

Fig. 9 is a fragmentary sectional view taken from the plane 9—9 of Fig. 1.

Figure 10:
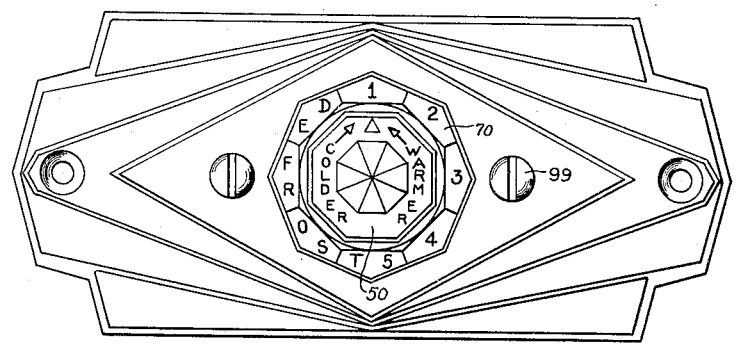
Fig. 10 is a top plan view of the switch device of Fig. 1 illustrating an ornamental design for the parts thereof.

Referring now to the drawings, I have shown at 1 a base formed of suitable insulating material such as Bakelite and comprising an inverted generally cup-shaped portion 2 having integral therewith and extending laterally from the upper portion of the cup a shelf 3. The bottom of the inverted cup section 2 is centrally apertured for a purpose to be later described and is further provided with a laterally disposed recess 2¹ having spaced apertures extending therefrom through the bottom adapted to have ears 5 of a generally U-shaped preferably sheet metal member 6 projected therethrough. The member 6 is secured to the bottom of the cup in any suitable manner as by rivets 7.

A thermostatic bellows, generally indicated at 8, comprises a movable head 9 sealingly secured to a bellows tube 10 in a suitable manner such as by soldering, and a fixed head 11 sealingly secured to the opposite end of the tube 10 is disposed within the inverted cup 2 of the base 1. The movable head 9 is preferably circular in shape but the fixed head 11 is preferably square and is provided with perforations in the corners thereof laterally of the tube 10, whereby the plate 11 may be rigidly secured to the bottom of the cup 2 by means of screws 12 which threadedly engage relatively thickened corner portions of the cup. The fixed plate or head 11 is centrally apertured and has sealingly joined thereto a relatively short sleeve 13; the sleeve 13 has leading therefrom a flexible metal tube 14 sealingly joined at its opposite end with a temperature bulb 15. The bellows 8, tube 14, and temperature bulb 15 are filled with a suitable volatile thermally expansible material, preferably injected through the end of the temperature bulb which is then sealed, in a well known manner.

A flexible spring 15' preferably encircles the capillary tube 14 and is disposed within the sleeve 13 whereby the tube 14 will be prevented from bending at a sharp angle in a manner well understood which will thus ensure a proper flow of the volatile material.

An increase in temperature of the bulb 15 will thus tend to move the head 9 upwardly due to the expansion of the volatile material; and a decrease in temperature due to the contraction of the material will cause the head 9 to move downwardly.

The head 9 is depressed centrally as indicated at 16 to form a pocket for a pin 17 which is rigidly secured therein, the upper portion of the pin being provided with a conical point as indicated at 18.

The shelf 3 adjacent the outer end thereof is provided with spaced bosses 19—19 adapted to support fixed contacts 20 and 21.

As is best illustrated in Fig. 6, the fixed contact 20 comprises a tubular metal bushing of suitable conducting material embedded in the insulated shelf portion 3 of the base, the contacts proper comprising a headed pin 22 having the stem portion thereof forced within the bore of the tubular bushing. The lower portion of the bushing is threaded to engage a terminal screw 23 whereby contact with a lead wire or the like may be made intermediate the bushing end and the head of the screw.

The contact 21 comprises a tubular bushing 23' of conducting material having pins 22—22 pressed into the top and bottom portions of the bore of the bushing to provide fixed contacts at these points.

A movable contact bar 24 is adapted to wipingly engage the fixed contacts 20 and 21 in a manner to be described.

The ears 5 above referred to are provided with aligned perforations adapted to receive a transversely disposed pin 26 upon which are pivoted a switch arm 27, generally U-shaped and a lever 28, the lever being most clearly illustrated in Fig. 1. The lever 28 comprises a generally flat strip provided with downwardly extending ears 29 pivotally engaging the pin 26 and at its opposite end is provided with integral downwardly extending legs 30—30, flared outwardly to provide generally U-shape pockets 31 at the lower end of the legs. The lever 28 at a point adjacent the pivot pin 26 is provided with a rigidly mounted downwardly extending button 32 having a downwardly open conical depression as indicated at 33, adapted to receive therein the conical point 18 of the pin 17 affixed to the thermostatic bellows whereby the lever will be raised or lowered about the pin 26 of the fulcrum as the bellows is thermostatically actuated.

Adjacent the legs 30 of the lever 28, the shelf 3 has rigidly secured thereto a generally U-shape member 34, the upstanding legs 34'—34' of which are disposed inwardly of the movable switch arm 27. Projecting inwardly from the legs 34'—34' are integral lugs 35—35 adapted to serve as fulcrums for the legs of a generally U-shaped overcenter lever 36.

The U-shaped lever 36 preferably formed from flat sheet metal has the ends of the legs thereof lodged in the pockets 31 provided on the lever 28, the intermediate portion of the legs rockingly engaging the underside of the fulcrum lugs 35; and the head of the U having affixed thereto a tension spring 37. Spaced abutments 38 integral with the shelf 3 of the base and adapted to act as stops for the lever 36 are provided under the head of the U.

The switch arm 27 supports at one end thereof the movable contact bar 24 and is preferably pivoted upon the pin 26 by lugs 27' straddling the ears 29 of the lever 28.

The end of the switch arm 27 is provided with a downwardly projecting tongue 39 to which is secured the other end of the tension spring 37, the movement of the lever 28 and the movable switch arm 27 thus being linked by the tension spring 37 and the U-shaped lever 36. As will be most clearly seen by reference to Fig. 1, when the end of the tension spring 37, which is affixed to the lever 36, is lower than the spring end affixed to the tongue 39 of the switch arm 27, the arm 27 will be drawn downwardly by the spring, and the movable contact bar 24 will wipingly engage each of the fixed contacts 20 and 21. Conversely, when the end of the tension spring 37, which is affixed to the lever 36 is moved upwardly, the movable contact bar 24 will be drawn upwardly to disengage the fixed contacts 20 and 21.

Thus, as the temperature in the refrigerating apparatus or the like increases, the bellows 8 will expand forcing the lever 28 upwardly about the pin 26 as a pivot due to the engagement of the pin 17 with the button 32; and the pockets 31 engaging the legs of the lever 36 will cause that end to be raised and the opposite end to be lowered as the lever 36 fulcrums about the projecting lug 35, thus causing the spring to pull downwardly on the arm 27 and, as previously described, making the circuit between the fixed contacts 20 and 21.

The circuit thus being completed will actuate the compressor or the like whereby the refrigerator will be cooled and when a predetermined temperature is attained, the reverse action will take place due to the snap action caused by the tension spring 37, and the movable contact bar 24 will be raised breaking the circuit and stopping the compressor. Thus, the circuit will be opened or closed by a snap action when predetermined low and high temperature limits are attained.

A plate 40 the general contour of which is illustrated in Fig. 3, is supported at a distance from and generally parallel to the base 1 by means of interposed sleeves 41 and screws 42 which are disposed within the sleeves and threadedly engage the base, the screw heads tightly abutting the upper base plate 40; and although I show two screws 42, it is understood that any suitable number may be employed.

The plate 40 is centrally apertured as indicated at 43 and rotatably supports a stem 44, comprising a lower externally threaded portion 45 and a coaxial relatively reduced portion 46, the reduced portion 46 being disposed within the aperture and maintained therein in any suitable manner such as securing thereto a washer 47 loosely engaging the upper surface of the plate 40. The upper portion 44 of the stem adjacent the end is provided with a circular groove 48 and upstanding preferably diametrically disposed lugs 49.

A porcelain or the like cap 50 is recessed on the underside and has rigidly secured therein a bushing 51, the bottom of the recess radially inwardly of the bushing being provided with a plurality of grooves adapted to form seats for the lugs 49 whereby the stem and the cap 50 will be maintained in relatively non-rotatable relationship.

The bushing 51 is provided with a laterally disposed threaded aperture adapted to accommodate a set screw 52, the tip of which enters a recess 48 locking the cap with the stem, whereby the cap is locked on the stem 44 against axial movement. Thus, by rotating the cap 50, the stem will be rotated, the cap preferably having a downwardly extending projection 53 adapted to engage and stop upon the upper end of a pin 54 rigidly secured to and extending vertically upward from the plate 40 to limit rotational movement of the cap in either direction to slightly less than a complete revolution, this being for a purpose to be later described although it is understood that this construction may be altered whereby more or less than a complete revolution may be effected.

Threadedly engaging the lower portion 45 of the stem is a cap 55 having a pair of laterally extending notched tongues 56, slidably engaging the sleeves 41 whereby the cap 55 will be maintained in non-rotative relationship relative to the stem, and as the stem is rotated will move only upwardly or downwardly thereby altering the tension on a compression spring 57 disposed intermediate the under face of the cap 55 and the upper face of the fulcrum bar 28. Thus, by rotation of the stem, the spring tension exerted upon the lever 28 may be relatively increased or decreased as desired to effect the resistance encountered by the pin 16 operating the lever. As the spring tension upon the lever is increased, the thermostat 8 will respond to a relatively higher temperature to actuate the lever 28 to close the contacts to effect operation of the compressor or the like. Conversely, a lessening of the spring tension will permit the compressor to be operated at a relatively lower temperature. Thus, the mean temperature or temperature "range" at which it is desired to maintain the refrigerating apparatus may be raised or lowered through rotation of the cap 50.

However, it is also desirable to control the temperature "differential" or difference between the high temperature at which the compressor is started and low temperature at which it is stopped; and to this end a "differential" adjustment is provided, controlling the number of degrees between the opening and closing operations of the switch above described.

The stem is provided with a coaxial bore 59, the upper portion of which is threaded and the lower portion of which terminates in a relatively reduced bore 60 and shoulder 60'. The bore 60 has slidingly disposed therein a pin 61 having a collar 62 and an upper stem 63, the pin being of sufficient length to normally project beyond the lower end of the stem when the collar engages the shoulder and to abut upon a preferably raised portion of the lever 28. Compressively engaging the upper face of the collar 62 is the end convolution of a vertically disposed helical spring 65 encased in the bore 59. A threaded plug 67 abuts the upper end convolution of the spring 65 and is adapted to regulate the tension of the spring by rotation of the plug thus controlling the resistance offered by the pin 61 to upward movement of the fulcrum bar 28, and a projection 68 on the plug 63 centers the upper end of the spring in the bore 59.

Thus, during the upward movement of the lever 28, toward the switch closing position, it first compresses the spring 57 alone until it reaches the point where it engages the end of the pin 61 and from there on upwardly it also compresses the spring 65. Continued upward movement of the lever thereafter will bring it to the point whereat the snap action occurs, whereby the closure of the switch is effected at a temperature corresponding to the compression of both springs. When the temperature falls subsequently, and the thermostatic device is thrusting upwardly with less force upon the lever 28, the lever 28 will start to move downwardly under the propelling effort of both springs; continued downward movement will cause the lever to leave the spring 65; and after further movement downwardly finally reach the switch snap operation point.

Thus, the switch will close responding to both springs and open responding to the spring 57 alone.

By changing the tension adjustably of the spring 65, the higher temperature at which the lever moves upwardly to close the switch may be varied relative to the lower temperature at which the lever moves downwardly to open the switch, and thus the differential temperature or difference of temperature between the low and high values at which the lever 28 operates to operate the switch contact may be adjustably varied.

I have found that in practice, a suitable differential may be determined for one temperature range and thereafter upon adjusting the temperature range, the differential temperature need not be adjusted. To this end, the plug 67 is provided only with a screw driver slot 67' whereby it may be adjustably positioned when the switch is assembled by a so-called factory adjustment and left permanently at that adjustment.

The cap 50 controlling the predetermined temperature range may be marked in any suitable manner such as by arrows to indicate in which direction to rotate it for relatively decreasing or increasing the predetermined temperature range.

As a scale, to indicate adjusted positions of the cap 50, reference points are provided on a head 70, the construction and purposes of which will be presently described.

As will be understood in the refrigerating art, a refrigerator after a period of use at relatively low temperature, may accumulate frost upon the coils and other refrigerant conduit portions of the apparatus which will act as insulation, thereby lowering the efficiency of the apparatus, and it is therefore desirable to provide means to remove the frost or effect what is called a "defrosting" operation.

In the preferred practice of my invention, the spring 57 is so chosen with respect to its physical properties and dimensions that its compression may adjustably be changed from a relatively relaxed condition to a condition of maximum pressure to change the range temperature, as above described, from a minimum operating temperature to a maximum temperature at which defrosting will occur.

To this end, in order that this entire scale of adjustment may be effected by substantially a single revolution of the cap 50, the stem 44 is provided with a multiple thread and the scale or indicia on the head 70 is divided generally into two parts, on opposite sides of a central point indicated at "I". Moving the cap 50 to indicate scale position on the clockwise half of the scale as illustrated, will adjust the operating temperature range to various values for normal refrigerator operation, and moving the cap 50 to indicate points in the counter-clockwise portion of the scale will raise the temperature sufficiently high to effect defrosting operation while continuously operating the refrigerator compressor under the intermittent off and on control of the switch device as herein described.

As will be understood, this mode of effecting the defrosting operation is superior to that of the prior art in which the compressor is completely shut down to allow the frost to melt away, and then must be manually re-started again at the end of the defrosting operation. A temperature at which defrosting will occur may be had in the refrigerator without raising the temperature thereof to a food spoiling value.

I have found it desirable, however, to provide in a device of this class means whereby the compressor may be shut down and started up again manually as for example when it is desired to discontinue the use of the refrigerator for an extended period of time. For this purpose the following apparatus is provided.

A preferably Bakelite cup-shaped head 70, has rigidly secured in a perforation in the cup bottom, a bushing 71, most clearly illustrated in cross-section in Fig. 1. The head 70 is assembled with the stem portion 44 prior to assembly of the cap 50 therewith and has an aperture in the cup bottom thereof through which the pin 54, previously mentioned, projects and acts as a stop for the cap 50. The pin 54 thus prevents rotation of the head 70. A normally compressed spring 72 seats upon the bottom of the cup and abuts the axially spaced under face of the cap 50 or the bushing 51 thereof and is adapted to provide sufficient resilient pressure to normally maintain the head 70 in downwardly axially related position to the cap 50. Numerals or the like may be indicated on the upper face of the cup 70 as at 73 to form indicating means for rotatively positioning the cap 50, to adjust the temperature range as above described.

A generally vertically disposed metal strip 75 is bent inwardly toward the bushing 71, at the upper end portion thereof as indicated at 76 and at its upper end may be engaged by the under face of a shoulder portion of the bushing 71. The plate 40 as is most clearly illustrated in Fig. 3 is provided with a generally rectangular aperture 77 having an offset portion 78 through which the strip 75 normally extends as illustrated in broken line; and the lever 28 and base 1 are suitably apertured to freely engage the lower strip portions as indicated at 79 and 80, respectively, to generally but loosely guide vertical movement of the strip 75.

The strip 75 is provided with a laterally extending shoulder 82 adapted to normally engage the under side of the plate 40 when the strip is depressed and moved inwardly of the aperture 77 behind the offset portion 78, and is further provided with a laterally outwardly extending lug 83 to which is affixed one end of a helical spring 84, the other end of which is affixed to the plate 40.

The strip 75 is further provided at its lower end with a laterally extending lug 85 adapted to engage the under side of a pin 86 rigidly secured to the movable switch arm 27 when the strip 75 is moved upwardly.

Normally the strip 75 occupies the position indicated in Fig. 1 due to the fact that the projection 82 engages the under side of the plate 40 and prevents the strip moving upwardly under the force exerted by the tension spring 84. When it is desired to shut down the apparatus, the cup 70 and attached bushing 71 are pulled upwardly, whereby a lower frusto-conical shaped portion 90 of the bushing will engage the tip 76 of the strip 75, and force the strip outwardly radially. The strip 75 will thus be forced to the position indicated in broken line at 91, Fig. 3, allowing the spring 84 to force the strip upwardly and causing the strip 75 to lift lug 85 to engage the pin 86 and raise the movable switch arm 27 upwardly, thus breaking the circuit to the compressor or the like at the contacts 20—21 shutting down the compressor. This action is independent of the force exerted by the thermostatic element and will always function to break the circuit when desired, and maintain it broken.

To start up the apparatus again, the cup 70 may be forced downwardly manually thus forcing the strip 75 downwardly, and radially inwardly to engage the shoulder 82 with the under side of the plate 40 as illustrated in Fig. 3 and thereby lock the device in the compressor operating condition until it is desired again to shut down the apparatus. The lower portion of the cup 70 is preferably beveled as indicated at 93 to insure that upon engagement of the cup with the strip 75 when the cup is forced downwardly, a lateral or radially inwardly directed pressure will be exerted to cause the strip to move laterally to engage the under side of the plate 40.

A generally box-shaped downwardly open casing composed of any suitable material such as Bakelite encloses the upper portion of the switch mechanism resting upon the base 3 and positioned around the switch mechanism by means of integral downwardly projecting lugs 96 having relatively reduced ends 97, adapted to engage apertures 98 provided in the plate 40 and with the shoulders of the lugs seating upon the peripheral portions of the plate adjacent the aperture. The casing is further held in place by means of screws 99 disposed in the top wall of the casing and threaded into apertures 100 provided in the plate 40. The upper portion of the switch mechanism is thus completely enclosed with only the operable cap 50 controlling the temperature range and the control cup 70 projecting beyond the top wall of the casing.

The cup 70 is preferably provided with a band of varying color around the lower portion of the cup wall which will serve as an indicating means when the apparatus is in shut down condition. Thus at the upper portion, the cup 70 may be colored black and the lower portion red, the red normally being disposed within the casing and visible only when the apparatus is shut down to serve as a relatively simple indicating means.

Figure 12:
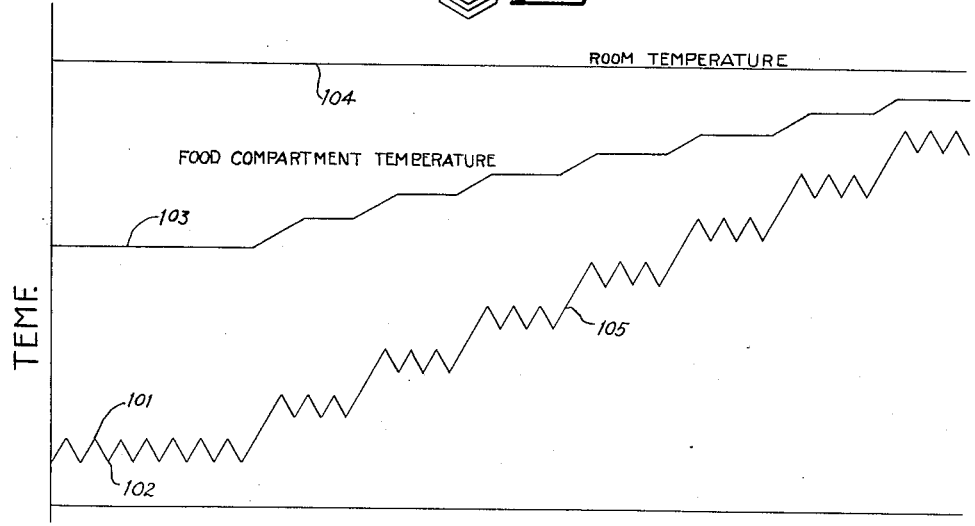
Fig. 12 is a chart illustrating diagrammatically temperature changes occurring in the operation of and by adjustment of the embodiment of my invention hereinafter to be described.

The effects of adjustment, and other aspects of temperature control of the apparatus above described which may be effected in connection with a refrigerator apparatus, are illustrated in the chart Fig. 12. At any given range adjustment, the values 101 and 102 indicate the upper and lower values and the differential therebetween at which the device periodically operates to start and stop the compressor to maintain an average or range temperature. These temperatures are those to which the bulb 15 is exposed. The temperature line 103 is the temperature which may be attained in the refrigerating compartment of a refrigerator and comparable therewith is the temperature line 104 indicating room temperature.

By moving the adjusting cap 50 counter-clockwise, the temperature range may be increased and at any increased value, the differentials will remain substantially constant. The chart indicates substantially uniform adjustments of the cap 50 over a large part of the scale. At the point 105 the adjustment is at the central position "1" indicated on the scale in the drawings, this being the highest operating temperature or range which may be desired. Beyond that point, by continuous successive steps of adjustment, the temperature rises into the defrosting zone, the increase of temperature or range for equal scale movements of the cap 50 being substantially equal and at substantially constant differential.

Due to the fact that overload conditions may be developed which would entail an excessive amperage being drawn through the switch mechanism and associated apparatus such as the compressor motor, an overload cut-out mechanism, Figs. 5 and 8, is provided to break the circuit when a predetermined current strength is attained.

The electric circuit through the switch device above described is by way of the terminal screw 23, contact 20, bar 24, upper contact 21, to lower contact 22; thence through a lever 120 formed of a suitable conducting material and fulcrumed about a downwardly generally V-shaped projection on the under side of the shelf 3 as indicated at 121. Between the contact 22 and projection 121, a spring 123 abuts upon the lever 120, abutting at its opposite end upon a collar 122 and a pin 122' passing through the lever 120 and fixed in the shelf 3.

The spring 123 engaging the under side of the lever, normally maintains the lever end in contact with the fixed contact pin 22. As illustrated in Fig. 7, a flexible lead 124 is affixed to the lever 120 in any suitable manner such as soldering, and, through a common terminal 125, joins a heating coil 126 which leads to another terminal 127. Thus the path of the current is by way of lever 120, the flexible lead 124, heating coil 126, and thence to the second terminal screw 127.

The heating coil 126 encircles a portion of a pin 128 on which is mounted a rotatable ratchet wheel 129 normally affixed to the pin through a medium such as solder of suitable fusing temperature. A tooth of the ratchet wheel 129 engages a tooth on the lower portion of a bar 130 formed of suitable insulating material. The upper portion of the bar 130 is preferably formed of a relatively stiff material such as metal comprising a flat strip 131 rigidly secured to the bar 130, the upper portion of the strip 131 being bent inwardly as at 131' for a sufficient distance to be engaged by the lower face of the defrosting cup 70. (See Figs. 3 and 5.)

The strip 131 has a laterally extending projection 132 which has secured thereto one end of a tension spring 133, the opposite end of the spring being secured to the plate 40. The ratchet bar 130 has an inwardly extending lug 134 adapted upon upward movement of the bar under impulsion of the spring 133, to engage the end of the lever 120 thus fulcruming it about the projection 121 to disengage the lever from the contact 22, thus breaking the circuit.

The heat developed in the coil 125 being a function of the current, will be transmitted to the pin 126 and thence to the solder or the like securing the ratchet wheel 129 to the pin. The ratchet wheel 129 normally serves as a locking medium preventing upward movement of ratchet bar 130; but when a predetermined current and consequent heating value is attained, the solder or the like will be fused permitting the ratchet wheel to rotate relative to the pin 126 upon which it is mounted, thus allowing the ratchet bar to be projected upwardly due to the influence of the spring 133. Upon cessation of the current, the solder or the like will be sufficiently cooled to again lock the ratchet wheel 129 in relatively non-rotatable relation with the pin 126 and the ratchet bar may be forced downwardly into its normal locked position as indicated in Fig. 5 by forcing the cup 70 downwardly whereby the lower portion thereof as at 135 will engage the laterally extending projection 131' of the ratchet bar and force it downwardly to the desired position over the ratchet wheel in a manner well understood, thus resetting the overload mechanism.

I preferably enclose the safety cut-out mechanism by means of a casing 130 which abuts the cup 2 and the shelf 1 to completely encase the same. The casing 130 may be rigidly secured by means of a screw 136 to the shelf 3.

Figure 11:
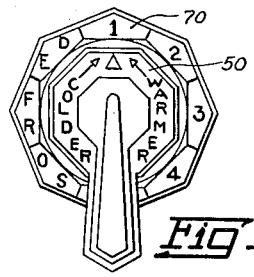
Fig. 11 is a view similar to Fig. 10 illustrating only a part thereof and showing a modification.

As illustrated in Fig. 11, the cap 50 may be provided with a handle whereby the adjusted position thereof may be readily visible at a distance and whereby it may be more readily turned to adjusted position.

In instances in which it is desirable to adjust the refrigerating apparatus to range temperatures very low in value, such for example as a few degrees above zero, it may not be desirable to change the range to a defrosting temperature by a single revolution of the adjusting cap 50; and in such instances, the cup 70 may be employed to effect the defrosting operation by shutting down the apparatus temporarily.

However, there are numerous applications wherein operating temperature ranges of the order of 20° to 30° above zero are suitable and in connection with which a temperature of 37° is suitable to effect defrosting. In these cases, the adjustment of the range from operating to defrosting temperature may be effected in the manner above described without shutting down the apparatus, and in these instances all of the advantages of my invention may be enjoyed. In the other extreme cases mentioned where defrosting may be effected by shutting down the apparatus, most of the advantages of my invention may be enjoyed and thus my invention comprehends in the scope thereof, both classes of use, namely that in which defrosting is effected by adjustment of the temperature range without shutting down the apparatus, and that in which a wider range of operating temperature adjustment is provided and in which the defrosting is effected by shutting down the apparatus.

The unitary switch mechanism above described is as will now be clear adapted to cut the compressor or the like apparatus in and out of circuit automatically at predetermined temperature limits to maintain an average temperature or range; the range may be adjustably varied through operating temperatures into a defrosting temperature; the differential between the said limits can be adjustably controlled; the aforementioned controls may be manually temporarily rendered non-operable to shut down the apparatus; and a simple dependable overload safety cut-out is provided.

In the temperature chart, Fig. 12, the temperature curves are merely illustrative of the general character of the changes of temperature indicated thereby and are not intended to be accurate as to the actual relative temperatures indicated by the ordinates of the diagram.

My invention is not limited to the exact details of construction shown and described. Many changes and modifications may be made within the scope and spirit of my invention without sacrificing its advantages.

I claim:

1. In a thermally actuable switch construction, a thermostat comprising an element movable responsive to temperature changes, a switch comprising a pair of contacts operable to be opened and closed by movement of the element at predetermined relatively low and high temperatures, switch adjustment means adapted to adjustably concurrently vary the responsiveness of said switch to effect both open and closing operations at higher temperatures or at lower temperatures, manually operable means movable in one direction to optionally open the contacts to render them inoperative by movement of the movable element and movable in the other direction to return them to their condition to be operated by movement of the movable element, a second switch comprising a movable contact operating element and contacts in series with the first named contact, a spring actuable movable element for moving the contact operating element of the second switch to open contact position, a thermally releasable latch for normally restraining the spring actuable movable element against movement, an electric heater for the thermally releasable latch in series with both sets of contacts, and the manually operable means being adapted to return the spring actuable movable element to latched position by movement in one direction.

2. In a thermally actuable switch construction, a thermostat comprising an element movable responsive to temperature changes, a switch comprising a pair of contacts operable to be opened and closed by movement of the element at predetermined relatively low and high temperatures, switch adjustment means adapted to adjustably concurrently vary the responsiveness of said switch to effect both open and closing operations at higher temperatures or at lower temperatures, manually operable means movable in one direction to optionally open the contacts to render them inoperative by movement of the movable element and movable in the other direction to return them to their condition to be operated by movement of the movable element, a second switch comprising a movable contact operating element and contacts in series with the first named contact, a spring actuable movable element for moving the contact operating element of the second switch to open contact position, a thermally releasable latch for normally restraining the spring actuable movable element against movement, an electric heater for the thermally releasable latch in series with both sets of contacts, and the manually operable means being adapted to return the spring actuable movable element to latched position by movement in the direction to optionally close the first named switch contacts.

CARLTON W. BONDURANT.